(12) United States Patent
Murai et al.

(10) Patent No.: US 11,164,698 B2
(45) Date of Patent: Nov. 2, 2021

(54) CERAMIC ELECTRONIC COMPONENT, MANUFACTURING METHOD OF CERAMIC ELECTRONIC COMPONENT, AND ELECTRONIC COMPONENT-MOUNTING CIRCUIT BOARD

(71) Applicant: Taiyo Yuden Co., Ltd., Tokyo (JP)

(72) Inventors: Wakaaki Murai, Tokyo (JP); Fumi Mori, Tokyo (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 0 days.

(21) Appl. No.: 16/548,190

(22) Filed: Aug. 22, 2019

(65) Prior Publication Data

US 2020/0066447 A1    Feb. 27, 2020

(30) Foreign Application Priority Data

Aug. 27, 2018 (JP) .................. 2018-158014

(51) Int. Cl.
| | |
|---|---|
| *H01G 4/224* | (2006.01) |
| *H01G 4/30* | (2006.01) |
| *H01G 4/232* | (2006.01) |
| *H01G 2/06* | (2006.01) |
| *H01G 2/10* | (2006.01) |
| *H01G 4/12* | (2006.01) |

(52) U.S. Cl.
CPC ............. *H01G 4/224* (2013.01); *H01G 2/06* (2013.01); *H01G 4/232* (2013.01); *H01G 4/30* (2013.01); *H01G 2/10* (2013.01); *H01G 4/12* (2013.01)

(58) Field of Classification Search
CPC ........... H01G 4/232; H01G 4/30; H01G 4/224
See application file for complete search history.

(56) References Cited

U.S. PATENT DOCUMENTS

| | | | | |
|---|---|---|---|---|
| 2013/0020913 | A1* | 1/2013 | Shirakawa | H01G 4/232 310/364 |
| 2015/0016013 | A1* | 1/2015 | Park | H01G 4/30 361/301.4 |
| 2015/0325377 | A1* | 11/2015 | Takeuchi | H01G 4/232 361/301.4 |
| 2016/0284471 | A1* | 9/2016 | Mizuno | H01G 4/30 |
| 2017/0271081 | A1* | 9/2017 | Maki | H01F 27/02 |

FOREIGN PATENT DOCUMENTS

| | | | |
|---|---|---|---|
| JP | 2015-228481 A | | 12/2015 |
| JP | 2017130572 A | * | 7/2017 |

* cited by examiner

*Primary Examiner* — Eric W Thomas
(74) *Attorney, Agent, or Firm* — Chip Law Group (57) ABSTRACT

Disclosed is a ceramic electronic component having external electrodes on each of opposing ends of a rectangular parallelepiped ceramic component body incorporating a functional portion. Facing directions of two opposing faces, other two opposing faces, and remaining two opposing faces of the ceramic component body are defined as first, second, and third directions, respectively, and dimensions along the respective directions are defined as first to third direction dimensions. Under this condition, the external electrode is of a two-face type continuously including a first face portion disposed on one face in the first direction and a second face portion disposed on one face in the third direction. A main layer portion of a protective portion is disposed on another face in the third direction and a first wraparound portion of the protective portion is disposed continuously with the main layer portion on each of the two faces in the second direction.

17 Claims, 9 Drawing Sheets

CERAMIC ELECTRONIC COMPONENT, MANUFACTURING METHOD OF CERAMIC ELECTRONIC COMPONENT, AND ELECTRONIC COMPONENT-MOUNTING CIRCUIT BOARD

CROSS REFERENCE TO RELATED APPLICATION

This application is based upon and claims benefit of priority from Japanese Patent Application No. 2018-158014, filed on Aug. 27, 2018, the entire contents of which are incorporated herein by reference.

BACKGROUND

The present disclosure relates to a ceramic electronic component such as a multilayer ceramic capacitor, a manufacturing method of the ceramic electronic component, and an electronic component-mounting circuit board in which the ceramic electronic component is mounted on a circuit board.

A ceramic electronic component such as a multilayer ceramic capacitor generally has a rectangular parallelepiped ceramic component body incorporating a functional portion such as a capacitive portion, and external electrodes disposed on each end in a longitudinal direction, of the ceramic component body. Known forms of each external electrode can be roughly classified into: (F1) a five-face type (so-called cap shape) continuously including a first face portion disposed on one face in a longitudinal direction, of the ceramic component body, second and third face portions disposed on each of two faces in a height direction, and fourth and fifth face portions disposed on each of two faces in a widthwise direction; (F2) a three-face type (so-called U shape) continuously including a first face portion disposed on one face in the longitudinal direction, of the ceramic component body, and second and third face portions disposed on each of two faces in the height direction; and (F3) a two-face type (so-called L shape) continuously including a first face portion disposed on one face in a longitudinal direction, of the ceramic component body, and a second face portion disposed on one face in the height direction.

Incidentally, the ceramic electronic components described hereinbefore are desired to be compatible with low-height mounting (low mounting height) with the thinning of electronic equipment such as a smartphone and a notebook computer. For satisfying this demand, it is desirable to reduce the height direction dimension of the ceramic component body, and additionally to adopt the two-face type external electrode having the least influence on the height direction dimension of the ceramic electronic component. However, in a case of reducing the height direction dimension of the ceramic component body, when the ceramic electronic component is mounted on the circuit board, specifically when each external electrode of the ceramic electronic component is connected to a conductive pad of the circuit board using solder, there are concerns about defects as described hereinafter, and therefore the defects will be explained with reference to FIGS. 1A and 1B.

Figure 1A:
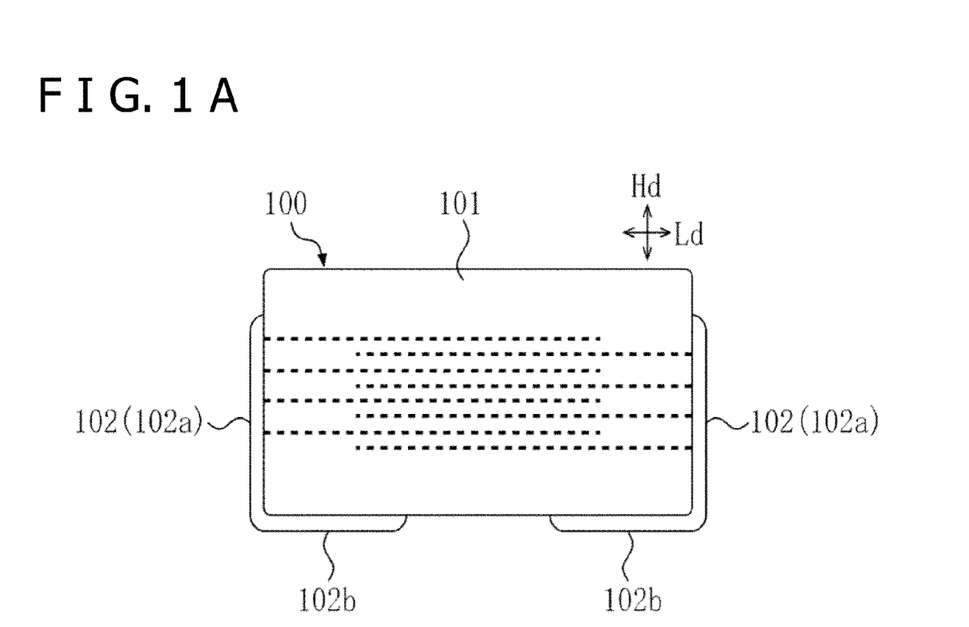
FIG. 1A is a side view of the existing ceramic electronic component.

FIG. 1A presents an example of a ceramic electronic component (multilayer ceramic capacitor) corresponding to FIG. 5 in Japanese Patent Laid-Open No. 2015-228481 described hereinafter. A ceramic electronic component 100 includes a rectangular parallelepiped ceramic component body 101 incorporating a capacitive portion, and two-face type external electrodes 102 disposed on each end in a lengthwise direction Ld, of the ceramic component body 101 (102a expresses a first face portion of each external electrode 102, and 102b expresses a second face portion of each external electrode 102).

Figure 1B:
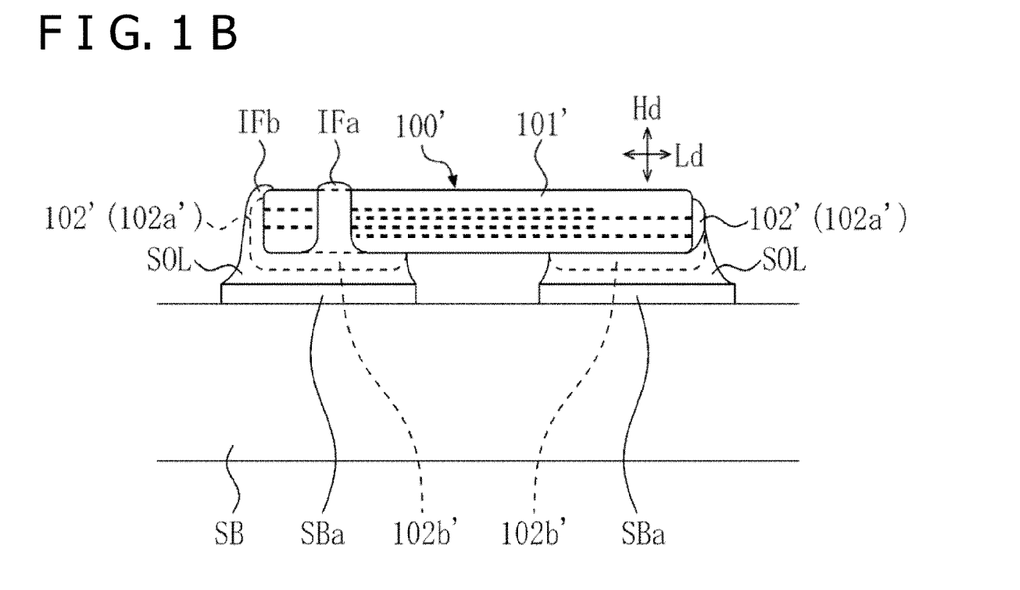
FIG. 1B is a drawing illustrating a state of mounting a ceramic electronic component obtained by changing a size of the ceramic electronic component depicted in FIG. 1A depending on a demand for low-height mounting (low mounting height)
Figure 2A:
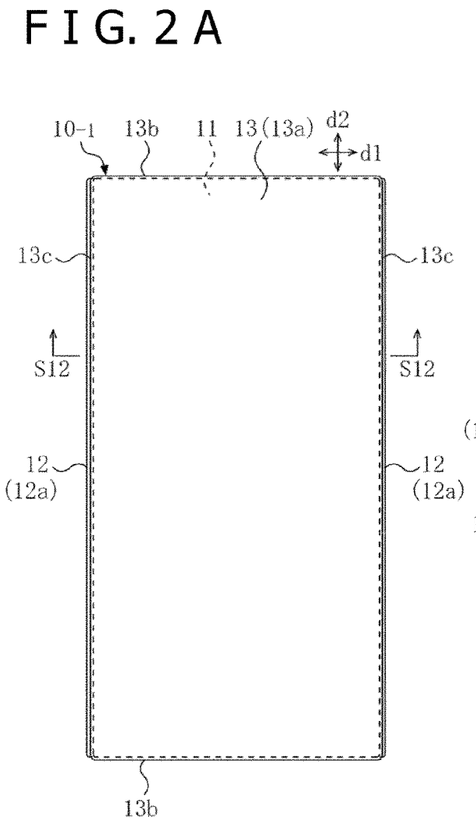
FIG. 2A is a plan view of the ceramic electronic component according to a first embodiment of the present disclosure.
Figure 2B:
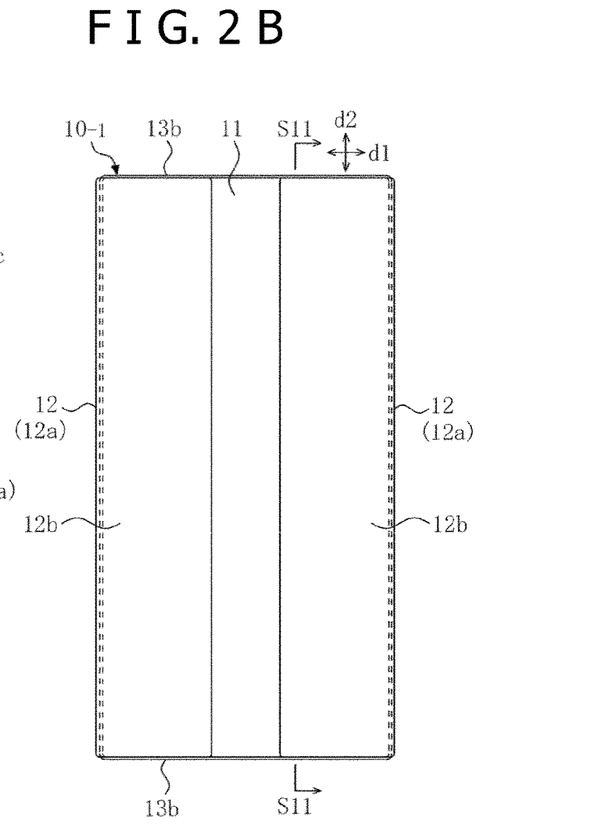
FIG. 2B is a bottom view of the ceramic electronic component.
Figure 2C:
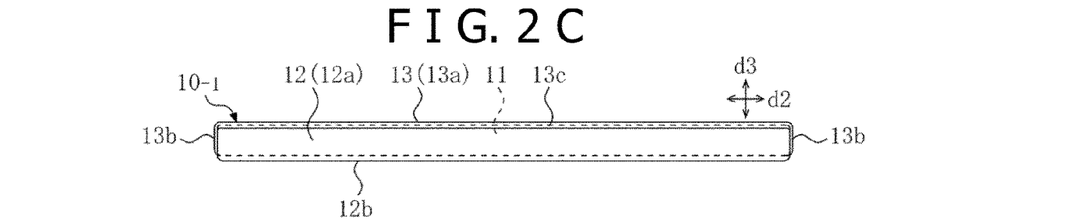
FIG. 2C is a side view of the ceramic electronic component in a first direction.
Figure 2D:
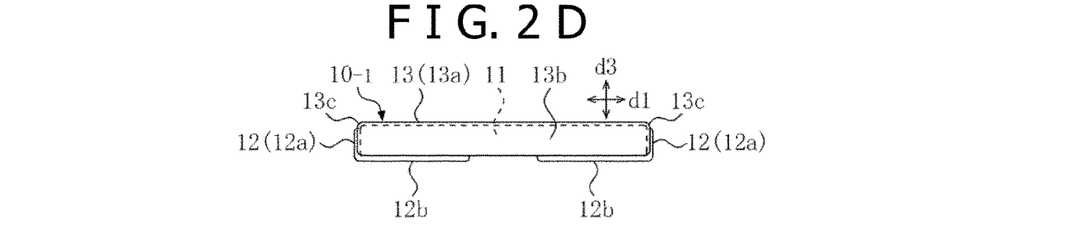
FIG. 2D is a side view of the ceramic electronic component in a second direction.

FIG. 1B presents an example of a ceramic electronic component 100' obtained by changing the size of the ceramic electronic component 100 depicted in FIG. 1A depending on the demand for the low-height mounting (low mounting height). In the ceramic electronic component 100', a dimension in a height direction Hd, of a ceramic component body 101' is considerably smaller than a dimension in a height direction Hd, of the ceramic component body 101 in FIG. 1A, and a dimension in a height direction Hd, of a first face portion 102a' of each external electrode 102' is considerably smaller than a dimension in a height direction Hd, of the first face portion 102a in FIG. 1A.

In a case that each of the external electrodes 102' is connected to a conductive pad SBa of a circuit board SB using a solder SOL, when the dimension in the height direction Hd, of the ceramic component body 101' is 100 μm or less, particularly 50 μm or less, a first soldering defect IFa and a second soldering defect IFb as depicted in the left side of FIG. 1B readily occur, although they hardly occur when the dimension in the height direction Hd, of the ceramic component body 101' in the ceramic electronic component 100' depicted in FIG. 1B is more than 250 μm. Incidentally, the right side of FIG. 1B presents a state that the soldering is normally performed.

To explain the first soldering defect IFa and the second soldering defect IFb, the first soldering defect IFa refers to a phenomenon that the molten solder goes around to an upper face in the height direction Hd, of the ceramic component body 101 through a face in a width direction Wd (not depicted in the figure), of the ceramic component body 101'. The second soldering defect IFb refers to a phenomenon that the molten solder excessively spreads up to the first face portion 102a' of the external electrode 102' and further extends to the upper face in the height direction Hd, of the ceramic component body 101.

The experiment indicates that although the second soldering defect IFb (excessive spreading of the molten solder) can be slightly improved by adjusting the amount of a solder paste to be applied to the conductive pad SBa of the circuit board SB before the mounting, the first soldering defect IFa (abnormal wraparound of the molten solder) is difficult to improve by the same method. The observation at the time of experiment suggests that the reason of the first soldering defect IFa (abnormal wraparound of the molten solder) is because the molten solder ascends on the face in the width direction Wd (not depicted in the figure), of the ceramic component body 101 within a behavior range of the melting soldering paste and extends to the upper face in the height direction Hd due to the small dimension in the height direction Hd, of the ceramic component body 101'.

That is, once the first soldering defect IFa occurs, the dimension in the height direction Hd, of the ceramic electronic component 100' mounted on the circuit board SB is larger than the initial mounting height due to solder SOL extending to the upper face in the height direction Hd, of the ceramic component body 101, and therefore the defect is unpreferable in view of satisfying the intended demand for the low-height mounting (low mounting height). In addition, there may be a concern that the solder SOL extending to the upper face in the height direction Hd, of the ceramic component body 101 electrically contacts other electronic components, wirings, or the like around the ceramic electronic component 100' mounted on the circuit board SB.

SUMMARY

The present disclosure has been made in view of the above, and it is desirable to provide a ceramic electronic component extremely useful for satisfying a demand for low-height mounting (low mounting height), a manufacturing method of the ceramic electronic component, and an electronic component-mounting circuit board in which the ceramic electronic component is mounted on a circuit board.

A ceramic electronic component according to an embodiment of the present disclosure refers to a ceramic electronic component having external electrodes on each of opposing ends of a rectangular parallelepiped ceramic component body incorporating a functional portion, in which a facing direction of two opposing faces of the ceramic component body is defined as a first direction, a facing direction of other two opposing faces is defined as a second direction, and a facing direction of remaining two opposing faces is defined as a third direction, and dimensions along the respective directions are defined as a first direction dimension, a second direction dimension, and a third direction dimension respectively, and under this condition, the external electrode is of a two-face type continuously including a first face portion disposed on one face in the first direction, of the ceramic component body, and a second face portion disposed on one face in the third direction, of the ceramic component body, a main layer portion of a protective portion is disposed on an other face in the third direction, of the ceramic component body, and a first wraparound portion of the protective portion is disposed continuously with the main layer portion on each of the two faces in the second direction, of the ceramic component body.

In addition, a manufacturing method of a ceramic electronic component according to another embodiment of the present disclosure refers to a manufacturing method of a ceramic electronic component having external electrodes on each of opposing ends of a rectangular parallelepiped ceramic component body incorporating a functional portion, in which a facing direction of two opposing faces of the ceramic component body is defined as a first direction, a facing direction of other two opposing faces is defined as a second direction, and a facing direction of remaining two opposing faces is defined as a third direction, and under this condition, the method includes (1) a process of producing the ceramic component body, (2) a process of producing each of two-face type external electrodes continuously including a first face portion disposed on one face in the first direction, of the ceramic component body, and a second face portion disposed on one face in the third direction, of the ceramic component body, and (3) a process of producing a protective portion in which a main layer portion is disposed on an other face in the third direction, of the ceramic component body, and first wraparound portions are disposed continuously with the main layer portion on each of the two faces in the second direction, of the ceramic component body, and the process of producing the protective portion includes dropping and spreading a curable resin paste for the protective portion onto the other face in the third direction, of the ceramic component body, and hardening the curable resin paste on the way of the spreading.

Furthermore, in an electronic component-mounting circuit board according to further another embodiment of the present disclosure, the ceramic electronic component described hereinbefore is mounted on the circuit board.

The ceramic electronic component, the manufacturing method of the ceramic electronic component, and the electronic component-mounting circuit board according to the present disclosure are extremely useful for satisfying the demand for low-height mounting (low mounting height).

DETAILED DESCRIPTION OF THE PREFERRED EMBODIMENTS

In the following description, for convenience sake, a facing direction of two opposing faces of a ceramic component body 11 depicted in FIG. 2 and FIG. 3 (lateral direction in FIG. 2A, FIG. 2B, FIG. 2D, and FIG. 3B) is denoted as "first direction d1," a facing direction of other two opposing faces (vertical direction in FIG. 2A and FIG. 2B, and lateral direction in FIG. 2C and FIG. 3A) is denoted as "second direction d2," and a facing direction of the remaining two opposing faces (vertical direction in FIG. 2C, FIG. 2D, FIG. 3A, and FIG. 3B) is denoted as "third direction d3."

In addition, a dimension along the first direction d1, of each constituent depicted in FIGS. 2A, 2B, 2C, 2D, 3A and 3B is denoted as "first direction dimension D1 [symbol of constituent]," a dimension along the second direction d2 is denoted as "second direction dimension D2 [symbol of constituent]," and a dimension along the third direction d3 is denoted as "third direction dimension D3 [symbol of constituent]." However, when explaining internal electrode layers 11a, dielectric layers 11b, dielectric margin portions (symbol is omitted), each external electrode 12, a protective portion 13 and the like, the term "thickness" is used for promoting understanding. Incidentally, a numerical value cited as each dimension refers to a design basic dimension and does not include a manufacture dimensional tolerance.

First Embodiment

Figure 3A:
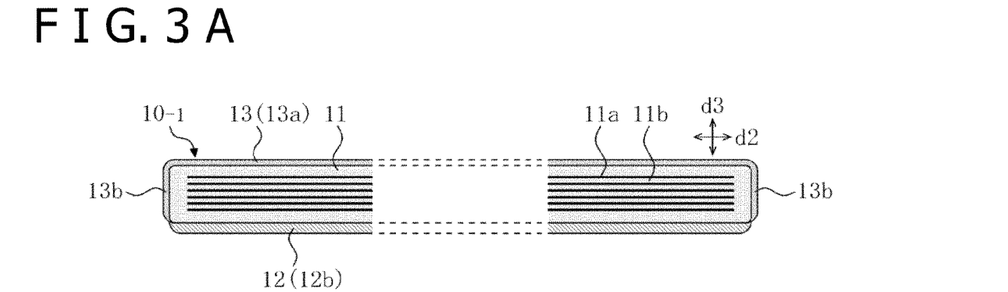
FIG. 3A is an enlarged sectional view along a line S11-S11 in FIG. 2B, which is partially omitted.
Figure 3B:
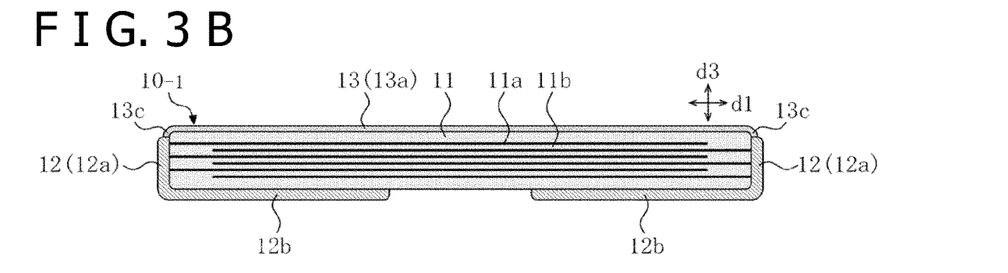
FIG. 3B is an enlarged sectional view along a line S12-S12 in FIG. 2A.
Figure 4A:
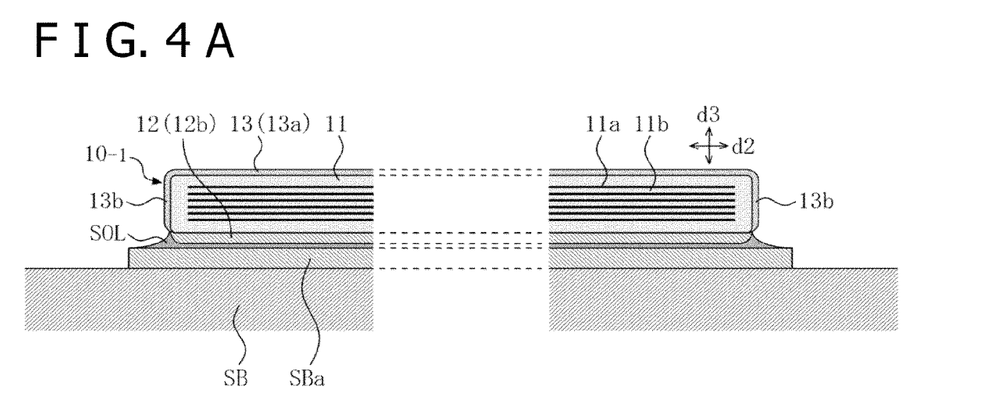
FIG. 4A is a drawing corresponding to FIG. 3A, illustrating a state of mounting the ceramic electronic component according to the first embodiment.
Figure 4B:
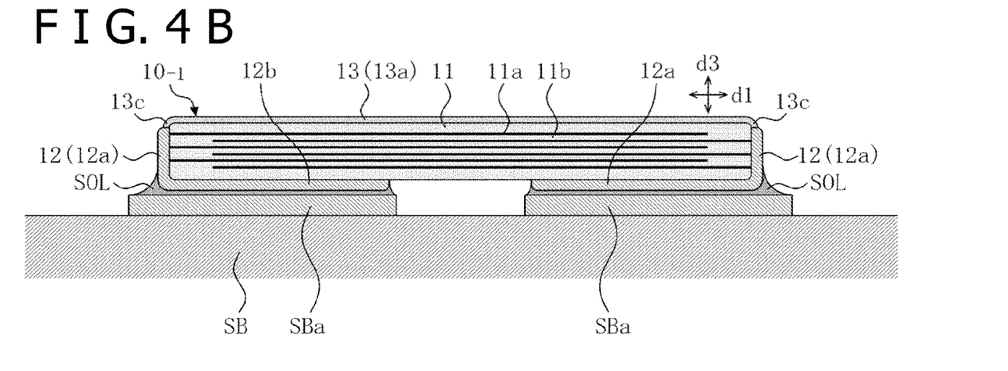
FIG. 4B is a drawing corresponding to FIG. 3B, illustrating a state of mounting the ceramic electronic component.

FIGS. 2A, 2B, 2C, 2D, 3A and 3B present a ceramic electronic component 10-1 (multilayer ceramic capacitor) according to a first embodiment of the present disclosure, and FIGS. 4A and 4B present a state that the ceramic electronic component 10-1 is mounted on the circuit board SB.

First, the configuration of the ceramic electronic component 10-1 (multilayer ceramic capacitor) will be explained with reference to FIGS. 2A, 2B, 2C, 2D, 3A and 3B.

The ceramic electronic component 10-1 (multilayer ceramic capacitor) corresponds to low-height mounting (low mounting height) and has the two-face type (so-called L-shaped) external electrodes 12 on each end portion in the first direction d1, of the rectangular parallelepiped ceramic component body 11 incorporating a capacitive portion (symbol is omitted). In addition, the ceramic electronic component 10-1 (multilayer ceramic capacitor) has the protective portion 13 in which a main layer portion 13a is disposed on the other face in the third direction d3, of the ceramic component body 11 (the upper face in FIG. 2C, FIG. 2D, FIG. 3A, and FIG. 3B).

The capacitive portion (symbol is omitted) is configured by a portion where the plurality of rectangular internal electrode layers 11a (total of six layers in FIGS. 3A and 3B) are laminated in the third direction d3 through the dielectric layers 11b (total of five layers in FIGS. 3A and 3B). The capacitive portion (symbol is omitted) is surrounded by the dielectric margin parts (symbol is omitted) on the both sides in the third direction d3 and dielectric margin parts (symbol is omitted) on the both sides in the second direction d2.

As depicted in FIG. 3B, the plurality of internal electrode layers 11a constituting the capacitive portion (symbol is omitted) are alternately shifted in the first direction d1, and one edge in the first direction d1, of the internal electrode layer 11a odd-numbered from the top in FIG. 3B is connected to a first face portion 12a of one external electrode 12 (external electrode 12 on the left side in FIG. 3B), and the other edge in the first direction d1, of the internal electrode layer 11a even-numbered from the top in FIG. 3B is connected to the first face portion 12a of the other external electrode 12 (external electrode 12 on the right side in FIG. 3B).

Each of the two-face type external electrodes 12 continuously includes the first face portion 12a disposed on one face in the first direction d1, of the ceramic component body 11 (left face or right face in FIG. 2A, FIG. 2B, FIG. 2D, and FIG. 3B), and a second face portion 12b disposed on one face in the third direction d3, of the ceramic component body 11 (lower face in FIG. 2C, FIG. 2D, FIG. 3A, and FIG. 3B).

As depicted in FIG. 3B, the end in the third direction d3, of the first face portion 12a of each external electrode 12 (upper end in FIG. 3B) does not reach the other face-side end in the third direction d3 on each of the two faces in the first direction d1, of the ceramic component body (upper end of the left face and the upper end of the right face in FIG. 3B). That is, each of two faces in the first direction d1, of the ceramic component body 11 (left and right faces in FIG. 3B) has a vacant space (symbol is omitted) where the end in the third direction d3, of the first face portion 12a of each external electrode 12 (upper end in FIG. 3B) does not reach.

The protective portion 13 includes the main layer portion 13a disposed on the other face in the third direction d3, of the ceramic component body 11 (upper face in FIG. 2C, FIG. 2D, FIG. 3A, and FIG. 3B), a first wraparound portion 13b disposed continuously with the main layer portion 13a on each of the two faces in the second direction d2, of the ceramic component body (upper and lower faces in FIG. 2A and FIG. 2B, and left and right faces in FIG. 2D and FIG. 3A), and a second wraparound portion 13c disposed continuously with the main layer portion 13a on the vacant space (symbol is omitted) on each of the two faces in the first direction d1, of the ceramic component body 11 (left and right faces in FIG. 2A, FIG. 2B, FIG. 2D, and FIG. 3B).

As depicted in FIG. 3A, the end of each first wraparound portion 13b (lower end in FIG. 3A) reaches one face-side end in the third direction d3 on each of the two faces in the second direction d2, of the ceramic component body 11 (lower end of the left face and the lower end of the right face in FIG. 3A). That is, the third direction dimension D3 [13b]

of each first wraparound portion 13b is equivalent to the third direction dimension D3 [11] of the ceramic component body 11.

As depicted in FIG. 3B, the end of each second wraparound portion 13c disposed on the vacant space (symbol is omitted) (lower end in FIG. 3B) reaches each end of the first face portion 12a of each external electrode 12 (upper end in FIG. 3B), and at least a part, preferably all part of the end of each second wraparound portion 13c contacts the end of the first face portion 12a. That is, the third direction dimension D3 [13c] of each second wraparound portion 13c is smaller than the third direction dimension D3 [13b] of each first wraparound portion 13b described hereinbefore.

Herein, the dimensions and materials of the constituents of the ceramic electronic component 10-1 (multilayer ceramic capacitor) depicted in FIGS. 2A, 2B, 2C, 2D, 3A and 3B will be complementarily explained.

<Dimension of Constituent>

The third direction dimension D3 [11] of the ceramic component body 11 can be, for example, 100 μm or less or 50 μm or less in consideration of low-height mounting (low mounting height). The first direction dimension D1 [11] and the second direction dimension D2 [11] of the ceramic component body 11 can be, for example, within a range of 200 to 1600 μm in view of a balance with the third direction dimension D3 [11]. Incidentally, the first direction dimension D1 [11] and the second direction dimension D2 [11] of the ceramic component body 11 depicted in FIGS. 2A, 2B, 2C, 2D, 3A and 3B have the relation of "the first direction dimension D1 [11]<the second direction dimension D2 [11]."

The thickness of each internal electrode layer 11a and the thickness of each dielectric layer 11b in the ceramic component body 11 can be, for example, within a range of 0.3 to 4 μm in consideration of low-height mounting (low mounting height). In addition, the thickness of each dielectric margin portion (symbol is omitted) can be, for example, within a range of 3 to 30 μm in consideration of low-height mounting (low mounting height). The first direction dimension D1 [11a] and the second direction dimension D2 [11a] of each internal electrode layer 11a, and the total number of the internal electrode layers 11a can be arbitrarily changed depending on the size, the desired capacitance value, and the like of the ceramic component body 11. In other words, the first direction dimension D1 [11a] and the second direction dimension D2 [11a] of each internal electrode layer 11a, and the total number of the internal electrode layers 11a are particularly limited as long as they fall within the scale of the ceramic component body 11.

The thicknesses of the first face portion 12a and the second face portion 12b in each external electrode 12 can be, for example, within a range of 2 to 18 μm in consideration of low-height mounting (low mounting height). The third direction dimension D3 [12a] of the first face portion 12a can be, for example, within a range of 6/10 to 9/10 of the third direction dimension D3 [11] of the ceramic component body 11, on the presumption that the edge of each internal electrode layer 11a can be connected to the 12a. The first direction dimension D1 [12b] of the second face portion 12b can be, for example, within a range of 2/10 to 4/10 of the first direction dimension D1 [11] of the ceramic component body 11, and intervals between each the second face portion 12b in the first direction d1 can be, for example, 100 μm or more.

The thickness of the main layer portion 13a, the thickness of each first wraparound portion 13b, and the thickness of each second wraparound portion 13c in the protective portion 13 are, for example, within a range of 0.5 to 5 μm in consideration of low-height mounting (low mounting height). In addition, among the thickness of the main layer portion 13a, the thickness of each first wraparound portion 13b, and the thickness of each second wraparound portion 13c in the protective portion 13, the thickness of at least each second wraparound portion 13c is desirably equal to or less than the thickness of the first face portion 12a of each external electrode 12 in contact with the second wraparound portion 13c.

<Material of Constituent>

Examples of a main ingredient of each dielectric layer 11b and a main ingredient of each dielectric margin portion (symbol is omitted) in the ceramic component body 11 include dielectric ceramics such as barium titanate, strontium titanate, calcium titanate, magnesium titanate, calcium zirconate, calcium titanate zirconate, barium zirconate, and titanium oxide. Incidentally, the main ingredient of each dielectric layer 11b and the main ingredient of the dielectric margin portion (symbol is omitted) on both sides in the third direction d3 may be different from each other, or otherwise the main ingredient of each dielectric layer 11b, the main ingredient of the dielectric margin portion (symbol is omitted) on one side in the third direction d3, and the main ingredient of the dielectric margin portion (symbol is omitted) on the other side in the third direction d3 are different from each other. Examples of the main ingredient of each internal electrode layer 11a include metals such as nickel, copper, palladium, platinum, silver, gold, and an alloy thereof.

Although each external electrode 12 can be, for example, in a one-layer configuration, a two-layer configuration, and a three-layer configuration in consideration of low-height mounting (low mounting height), a four-layer configuration and a five-layer configuration can also be adopted if the thickness of the second face portion 12b affecting the low-height mounting (low mounting height) is thin.

Examples of the main ingredient of each external electrode 12 in the case where each external electrode 12 is in the one-layer configuration include metals such as copper, nickel, silver, gold, platinum, palladium, tin, chromium, titanium, tantalum, tungsten, and molybdenum.

When each external electrode 12 is in the two-layer configuration, examples of the main ingredient of the inner layer and the main ingredient of the outer layer include the same metals as in the case of the one-layer configuration. The main ingredient of the inner layer and the main ingredient of the outer layer are the same or different from each other. Incidentally, when the main ingredient of the inner layer and the main ingredient of the outer layer are different from each other, a combination of chromium, titanium, or tungsten as the main ingredient of the inner layer and copper as the main ingredient of the outer layer, a combination of copper as the inner layer and tin as the outer layer, and the like may be adopted on the basis of mutual adhesiveness, solderability and the like.

When each external electrode 12 is in the three-layer configuration, as the main ingredient of the inner layer, the main ingredient of the intermediate layer, and the main ingredient of the outer layer, examples of the main ingredients include the same metals as in the case of the one-layer configuration, and the main ingredient of the inner layer, the main ingredient of the intermediate layer, and the main ingredient of the outer layer may be the same or different from each other. Incidentally, when the main ingredient of the inner layer, the main ingredient of the intermediate layer, and the main ingredient of the outer layer are different from each other, a combination of chromium, titanium, or tungsten as the main ingredient of the inner layer, copper as the main ingredient of the intermediate layer and tin as the main ingredient of the outer layer, a combination of copper as the main ingredients of the inner layer, nickel as the main ingredient the intermediate layer and tin as the main ingredient of the outer layer, and the like may be adopted on the basis of mutual adhesiveness, solderability and the like.

For manufacturing each external electrode 12, a dry plating method such as sputtering and vacuum deposition, and a wet plating method such as electroplating and electroless plating can be selectively adopted regardless of the layer configurations described hereinbefore. That is, for the one-layer configuration, for example, a method of producing the one layer by a dry plating method or a wet plating method can be adopted. For the two-layer configuration, for example, in addition to a method of producing the inner layer and the outer layer by the dry plating method or the wet plating method, a method of producing the inner layer by either a dry plating method or a wet plating method, and on the other hand, producing the outer layer can be adopted. For the three-layer configuration, for example, in addition to a method of producing the inner layer, the intermediate layer and the outer layer by a dry plating method or a wet plating method, a method of producing one layer out of the three layers by either the dry plating method or the wet plating method, and on the other hand, producing the remaining two layers, and a method of producing the two layers out of the three layers by either the dry plating method or the wet plating method, on the other hand, producing the remaining one layer, can be adopted.

Examples of the main ingredient of the protective portion 13 include a thermosetting resin such as an epoxy resin, a phenol resin, an urethane resin, a silicone resin, and a polyimide resin, or a photocurable resin containing at least a modified acrylate (epoxy acrylate, urethane acrylate, acrylic resin acrylate, and the like) and a polymerization initiator.

Next, a manufacturing method of the ceramic electronic component 10-1 (multilayer ceramic capacitor) depicted in FIGS. 2A, 2B, 2C, 2D, 3A and 3B will be explained. The manufacturing method explained herein is merely a preferable example, and does not limit the manufacturing method of the ceramic electronic component 10-1 (multilayer ceramic capacitor) depicted in FIGS. 2A, 2B, 2C, 2D, 3A and 3B.

The manufacturing method of the ceramic electronic component 10-1 (multilayer ceramic capacitor) includes (1) a process of producing the ceramic component body 11, (2) a process of producing two-face type external electrodes 12 on each end portion in the first direction d1, of the ceramic component body 11, and (3) a process of producing the protective portion 13 on the ceramic component body 11 on which each external electrode 12 has been produced.

The process (1) of producing the ceramic component body 11 includes a step of producing a multiple-patterning unbaked multilayer sheet by appropriately laminating and pressure-bonding a ceramic green sheet having no internal electrode layer pattern and a ceramic green sheet having the internal electrode layer pattern, a step of producing a unbaked chip corresponding to the ceramic component body 11 by chopping the unbaked multilayer sheet, a step of grinding the unbaked chip, and a step of producing the ceramic component body 11 by baking the unbaked chip under an atmosphere and a temperature profile depending on the ceramic material and the metal material.

The process (2) of producing the two-face type external electrodes 12 includes a step of producing the one-layered, two-layered, or three-layered external electrodes 12 continuously including the first face portion 12a disposed on one face in the first direction d1, of the ceramic component body 11 (left face or right face in FIG. 2A, FIG. 2B, FIG. 2D, and FIG. 3B), and the second face portion 12b disposed on one face in the third direction d3, of the ceramic component body 11 (lower face in FIG. 2C, FIG. 2D, FIG. 3A, and FIG. 3B), using the dry plating method and the wet plating method described hereinbefore.

The process (3) of producing the protective portion 13 includes a step of dropping and spreading a previously prepared curable resin paste (the main ingredient is the thermosetting resin or photocurable resin described hereinbefore, and the illustration is omitted) for the protective portion onto the center or approximately center of the other face in the third direction d3, of the ceramic component body 11 (upper face in FIG. 2C, FIG. 2D, FIG. 3A, and FIG. 3B) using a dispenser or the like, and a step of hardening the curable resin paste based on heat generation or photoirradiation, on the way of the spreading.

A viscosity of the curable resin paste suitable for carrying out the spreading step can be, for example, within a range of 0.5 to 50 Pas (pascal seconds), and in consideration of ease in controlling the spreading by curing, a range of 3 to 10 Pas (pascal seconds). That is, if the viscosity of the curable resin paste is too low, the spreading is hardly controlled by the curing, and conversely if the viscosity of the curable resin paste is too high, the spreading is insufficient and it becomes difficult to obtain the form of the protective portion 13 depicted in FIGS. 2A, 2B, 2C, 2D, 3A and 3B.

Next, soldering for mounting the ceramic electronic component 10-1 (multilayer ceramic capacitor) on the circuit board SB depicted in FIGS. 2A, 2B, 2C, 2D, 3A and 3B on the circuit board SB will be explained by presenting effects, with reference to FIGS. 4A and 4B.

When the ceramic electronic component 10-1 is mounted on the circuit board SB depicted in FIGS. 4A and 4B, a soldering paste is applied to a conductive pad SBa corresponding to each external electrode 12 disposed on the circuit board SB by printing or the like, and the ceramic electronic component 10-1 is installed so that the second face portion 12b of each external electrode 12 contacts the soldering paste. Subsequently, the circuit board SB equipped with the ceramic electronic component 10-1 is put into a reflow furnace (not depicted in the figure), and then, through a preheating step, a main heating step, and a cooling step, each external electrode 12 is soldered to each conductive pad SBa through solder SOL. Incidentally, the soldering paste is molten by heating, the molten solder spreads throughout each second face portion 12b of each external electrode 12 and also spreads up to each first face portion 12a.

In the behavior range of the soldering paste being molten, even if the molten solder attempts to ascend each of the two faces in the second direction d2, of the ceramic component body 11 (left and right faces in FIG. 4A), particularly each first wraparound portion 13b acts as an obstacle to suppress the ascent of the molten solder because each of the two faces in the second direction d2 (left and right faces in FIG. 4A) has the first wraparound portion 13b of the protective portion 13, and each first wraparound portion 13b is continuous with the main layer portion 13a. That is, in the ceramic electronic component 10-1, the first soldering defect IFa described in "BACKGROUND" (abnormal wraparound of molten solder, see FIG. 1B) is hardly caused.

In addition, the spreading of the molten solder up to the first face portion 12a of each external electrode 12 can be adjusted depending on the amount of the solder paste applied to the conductive pad SBa of the circuit board SB, and even if the amount of the molten solder spreading up is slightly excessive, particularly each second wraparound portion 13c acts as an obstacle to suppress the spreading up, because each end in the third direction d3 of each first face portion 12a (upper end in FIG. 4B) contacts the end of each second wraparound portion 13c of the protective portion 13 (lower end in FIG. 4B), and each second wraparound portion 13c is continuous with the main layer portion 13a. That is, in the ceramic electronic component 10-1, the second soldering defect IFa described in "BACKGROUND" (excessive amount of the molten solder spreading up) is also hardly caused.

That is, even if the third direction dimension D1 [11] of the ceramic component body 11 is decreased to meet the demand for low-height mounting (low mounting height), specifically even if the third direction dimension D1 [11] is 100 μm or less or 50 μm or less, the ceramic electronic component 10-1 can be favorably mounted on the circuit board SB by soldering.

Second Embodiment

Figure 5A:
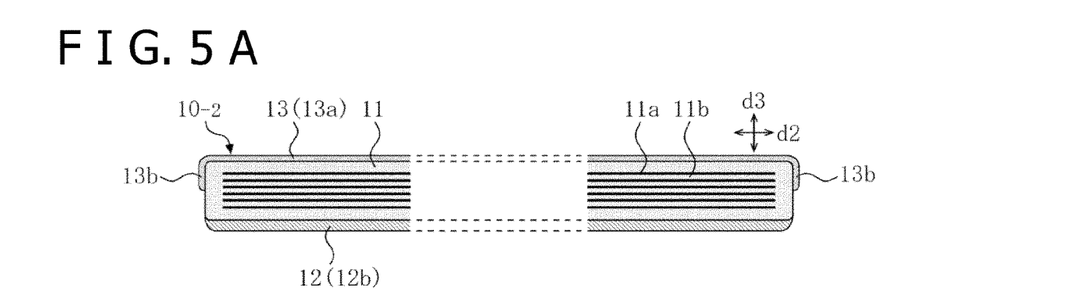
FIG. 5A is a drawing corresponding to FIG. 3A, illustrating the ceramic electronic component according to a second embodiment of the present disclosure.
Figure 5B:
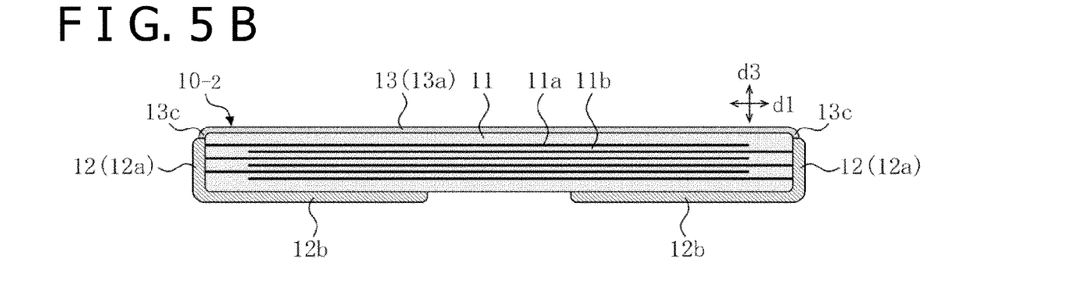
FIG. 5B is a drawing corresponding to FIG. 3B, illustrating the ceramic electronic component.
Figure 6A:
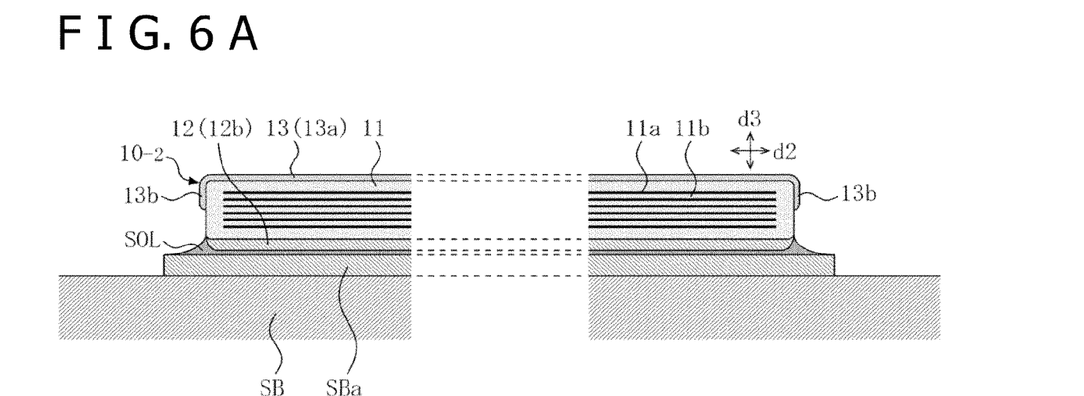
FIG. 6A is a drawing corresponding to FIG. 5A, illustrating a state of mounting the ceramic electronic component according to the second embodiment.
Figure 6B:
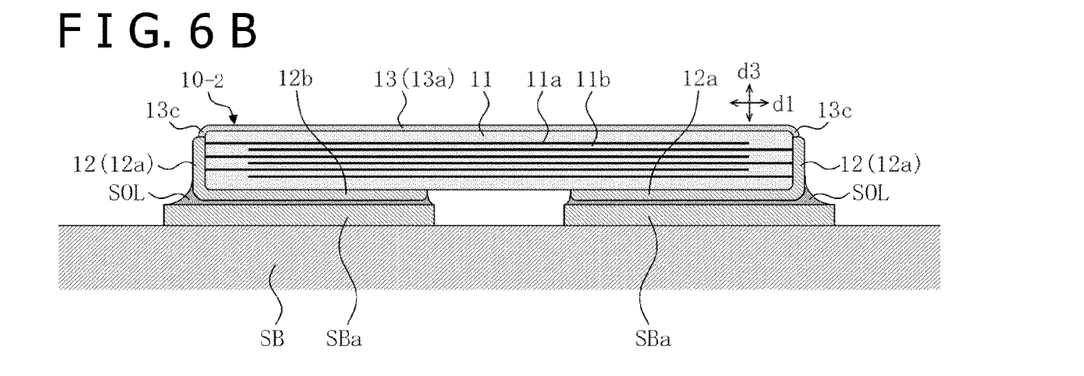
FIG. 6B is a drawing corresponding to FIG. 5B, illustrating a state of mounting the ceramic electronic component.

FIGS. 5A and 5B present a ceramic electronic component 10-2 (multilayer ceramic capacitor) according to a second embodiment of the present disclosure, and FIGS. 6A and 6B present a state of mounting the ceramic electronic component 10-2 on the circuit board SB.

The ceramic electronic component 10-2 (multilayer ceramic capacitor) depicted in FIGS. 5A and 5B is different in the configuration from the ceramic electronic component 10-1 (multilayer ceramic capacitor) according to the first embodiment depicted in FIGS. 2A, 2B, 2C, 2D, 3A and 3B in that:

the end of each first wraparound portion 13b of the protective portion 13 (lower end in FIG. 5A) does not reach one face-side end in the third direction d3 in each of the two faces in the second direction d2, of the ceramic component body 11 (lower end of the left face and lower end of the right face in FIG. 5A), i.e. the third direction dimension D3 [13b] of each first wraparound portion 13b is smaller than the third direction dimension D3 [11] of the ceramic component body 11.

Incidentally, the third direction dimension D3 [13b] of each first wraparound portion 13b of the protective portion 13 can be, for example, within a range of ¼ to ¾ (½ in the FIG. 5A) of the third direction dimension D3 [11] of the ceramic component body 11, and the third direction dimension D3 [13b] of each first wraparound portion 13b is larger than the third direction dimension D3 [13c] of each second wraparound portion 13c. Since the other configurations are the same as of the ceramic electronic component 10-1 (multilayer ceramic capacitor) depicted in FIGS. 2A, 2B, 2C, 2D, 3A and 3B, explanations of the other configurations are omitted.

Compared to the ceramic electronic component 10-1 (multilayer ceramic capacitor) according to the first embodiment depicted in FIGS. 2A, 2B, 2C, 2D, 3A and 3B, the ceramic electronic component 10-2 (multilayer ceramic capacitor) depicted in FIGS. 5A and 5B has a small third direction dimension D3 [13b] of each first wraparound portion 13b of the protective portion 13, but can provide the same effect as described hereinbefore in the soldering for mounting the ceramic electronic component 10-2 on the circuit board SB (see FIGS. 6A and 6B).

Third Embodiment

Figure 7A:
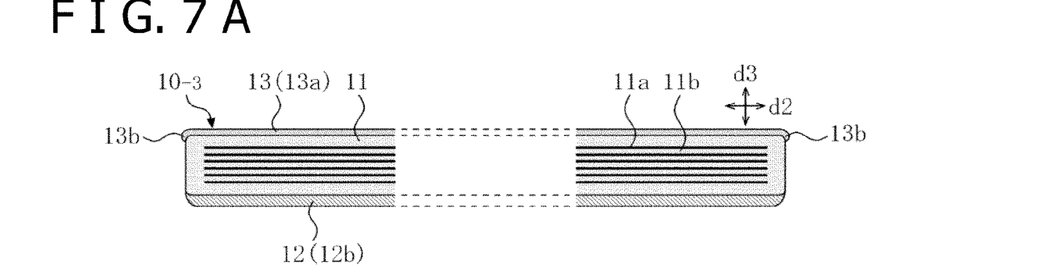
FIG. 7A is a drawing corresponding to FIG. 3A, illustrating the ceramic electronic component according to a third embodiment of the present disclosure.
Figure 7B:
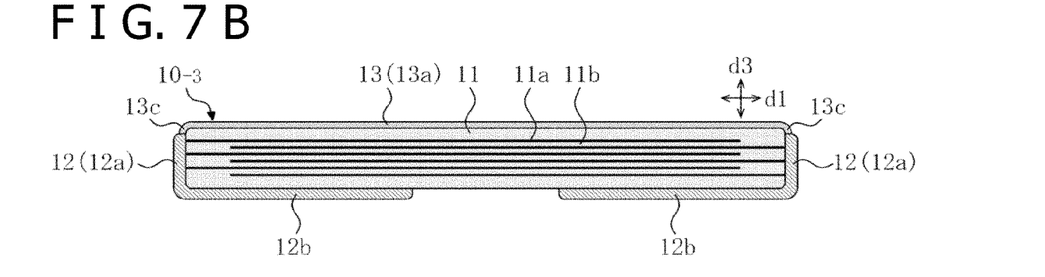
FIG. 7B is a drawing corresponding to FIG. 3B, illustrating the ceramic electronic component.
Figure 8A:
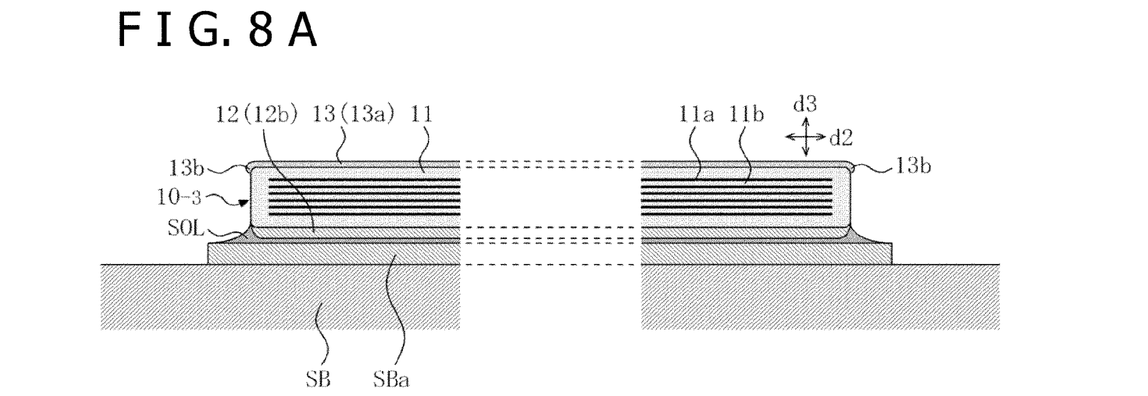
FIG. 8A is a drawing corresponding to FIG. 7A, illustrating a state of mounting the ceramic electronic component according to the third embodiment.
Figure 8B:
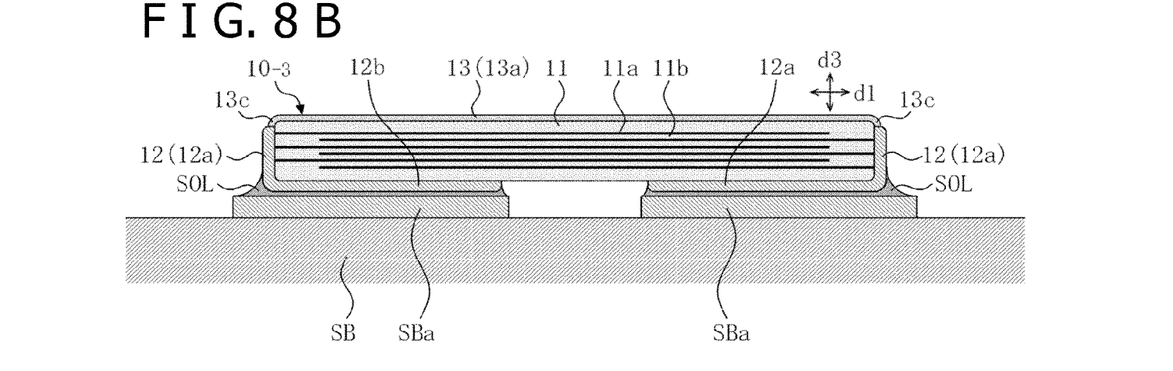
FIG. 8B is a drawing corresponding to FIG. 7B, illustrating a state of mounting the ceramic electronic component.

FIGS. 7A and 7B present a ceramic electronic component 10-3 (multilayer ceramic capacitor) according to a third embodiment of the present disclosure, and FIGS. 8A and 8B present a state of mounting the ceramic electronic component 10-3 on the circuit board SB.

The ceramic electronic component 10-3 (multilayer ceramic capacitor) depicted in FIGS. 7A and 7B is different in the configuration from the ceramic electronic component 10-1 (multilayer ceramic capacitor) according to the first embodiment depicted in FIGS. 2A, 2B, 2C, 2D, 3A and 3B in that:

the end of each first wraparound portion 13b of the protective portion 13 (lower end in FIG. 7A) does not reach one face-side end in the third direction d3 on each of the two faces in the second direction d2, of the ceramic component body 11 (lower end of the left face and lower end of the right face in FIG. 5A), i.e. the third direction dimension D3 [13b] of each first wraparound portion 13b is considerably smaller than the third direction dimension D3 [11] of the ceramic component body 11.

Incidentally, the third direction dimension D3 [13b] of each first wraparound portion 13b of the protective portion 13 is equal to or approximately equal to the third direction dimension D3 [13c] of each second wraparound portion 13c. In other words, the third direction dimension D3 [13b] of each first wraparound portion 13b is equivalent to the third direction dimension D3 [13c] of each second wraparound portion 13c. Since the other configurations are the same as of the ceramic electronic component 10-1 (multilayer ceramic capacitor) depicted in FIGS. 2A, 2B, 2C, 2D, 3A and 3B, explanations of the other configurations are omitted.

Compared to the ceramic electronic component 10-1 (multilayer ceramic capacitor) according to the first embodiment depicted in FIGS. 2A, 2B, 2C, 2D, 3A and 3B, the ceramic electronic component 10-3 (multilayer ceramic capacitor) depicted in FIGS. 7A and 7B has an extremely small third direction dimension D3 [13b] of each first wraparound portion 13b of the protective portion 13, but can provide the same effect as described hereinbefore in the soldering for mounting the ceramic electronic component 10-3 on the circuit board SB (see FIGS. 8A and 8B).

Fourth Embodiment

Figure 9A:
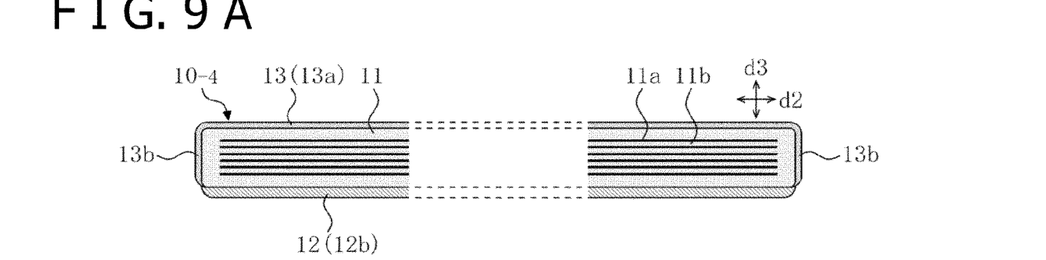
FIG. 9A is a drawing corresponding to FIG. 3A, illustrating the ceramic electronic component according to a fourth embodiment of the present disclosure.
Figure 9B:
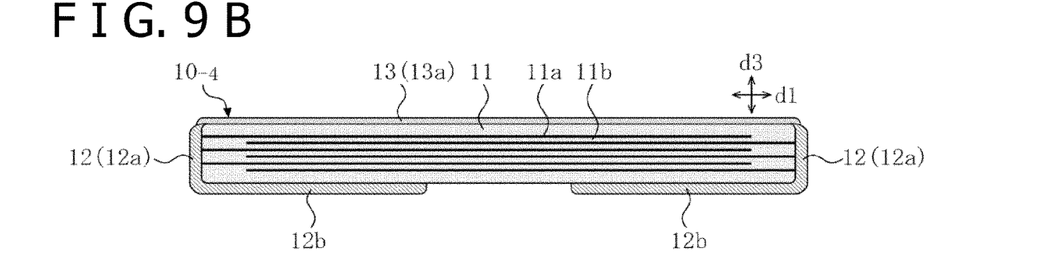
FIG. 9B is a drawing corresponding to FIG. 3B, illustrating the ceramic electronic component.
Figure 10A:
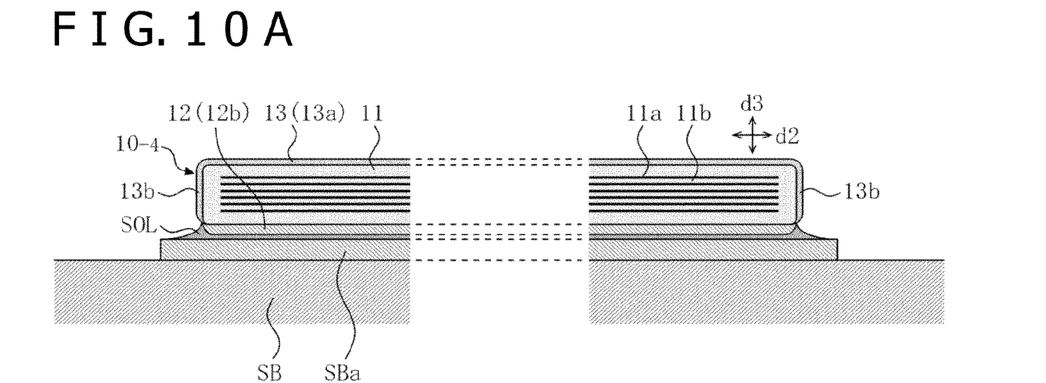
FIG. 10A is a drawing corresponding to FIG. 9A, illustrating a state of mounting the ceramic electronic component according to the fourth embodiment.
Figure 10B:
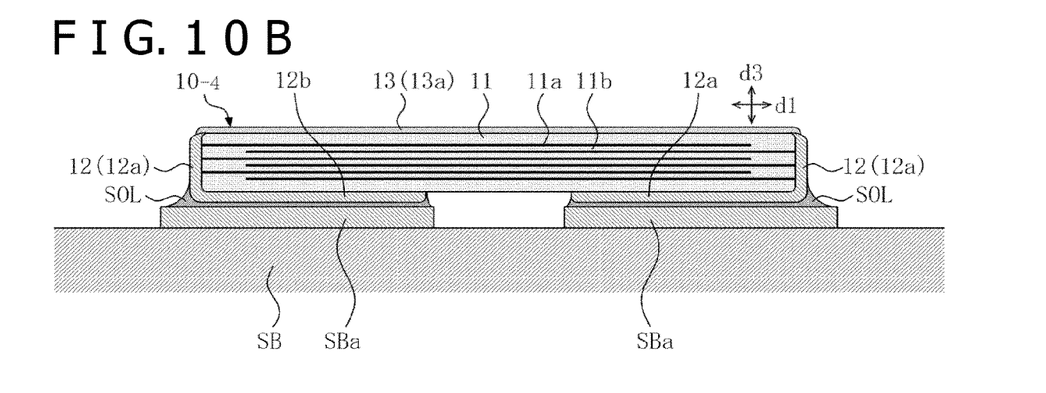
FIG. 10B is a drawing corresponding to FIG. 9B, illustrating a state of mounting the ceramic electronic component.

FIGS. 9A and 9B present a ceramic electronic component 10-4 (multilayer ceramic capacitor) according to a fourth embodiment of the present disclosure, and FIGS. 10A and 10B present a state of mounting the ceramic electronic component 10-4 on the circuit board SB.

The ceramic electronic component 10-4 (multilayer ceramic capacitor) depicted in FIGS. 9A and 9B is different in the configuration from the ceramic electronic component 10-1 (multilayer ceramic capacitor) according to the first embodiment depicted in FIGS. 2A, 2B, 2C, 2D, 3A and 3B in that:

the end in the third direction d3, of the first face portion 12a of each external electrode 12 (upper end in FIG. 9B) reaches the other face-side end in the third direction d3 on each of the two faces in the first direction d1, of the ceramic component body 11 (upper ends of the left and right faces in FIG. 9B) or the end of the other face in the third direction d3, of the ceramic component body 11 (upper face in FIG.

9B), i.e. the third direction dimension D3 [12a] of the first face portion 12a of each external electrode 12 is equivalent to the third direction dimension D3 [11] of the ceramic component body 11; and the protective portion 13 does not have the respective second wraparound portions 13c, and the edge portion in the first direction d1, of the main layer portion 13a of the protective portion 13 contacts the first face portion 12a of each external electrode 12.

Since the other configurations are the same as of the ceramic electronic component 10-1 (multilayer ceramic capacitor) depicted in FIGS. 2A, 2B, 2C, 2D, 3A and 3B, explanation of the other configurations are omitted.

Compared to the ceramic electronic component 10-1 (multilayer ceramic capacitor) according to the first embodiment depicted in FIGS. 2A, 2B, 2C, 2D, 3A and 3B, the ceramic electronic component 10-4 (multilayer ceramic capacitor) depicted in FIGS. 9A and 9B do not have the respective second wraparound portions 13c on the protective portion 13, but can provide the same effect as described hereinbefore in the soldering for mounting the ceramic electronic component 10-4 on the circuit board SB (see FIGS. 10A and 10B).

Fifth Embodiment

Figure 11A:
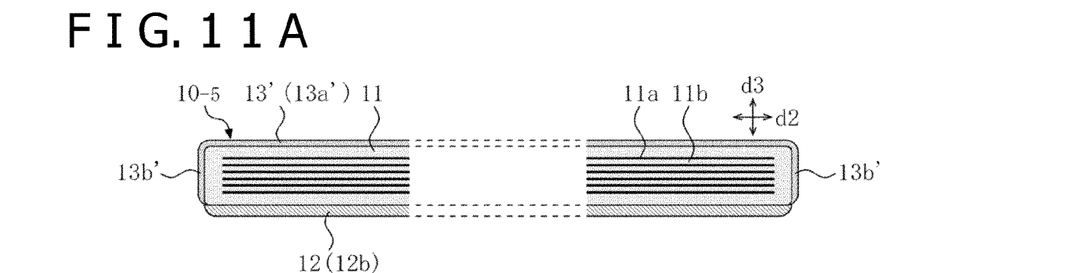
FIG. 11A is a drawing corresponding to FIG. 3A, illustrating the ceramic electronic component according to a fifth embodiment of the present disclosure.
Figure 11B:
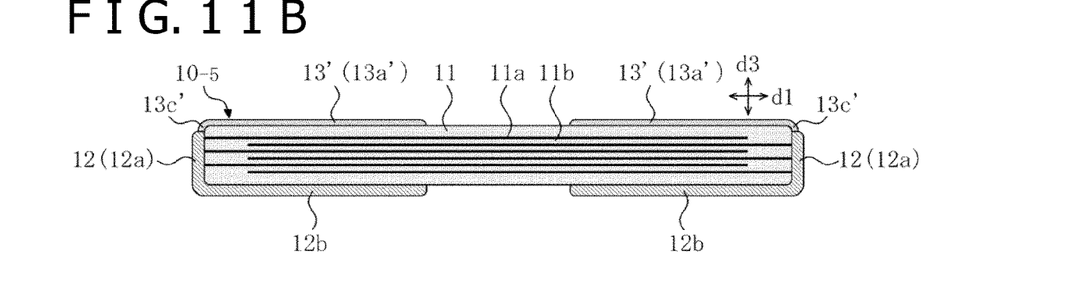
FIG. 11B is a drawing corresponding to FIG. 3B, illustrating the ceramic electronic component.
Figure 12A:
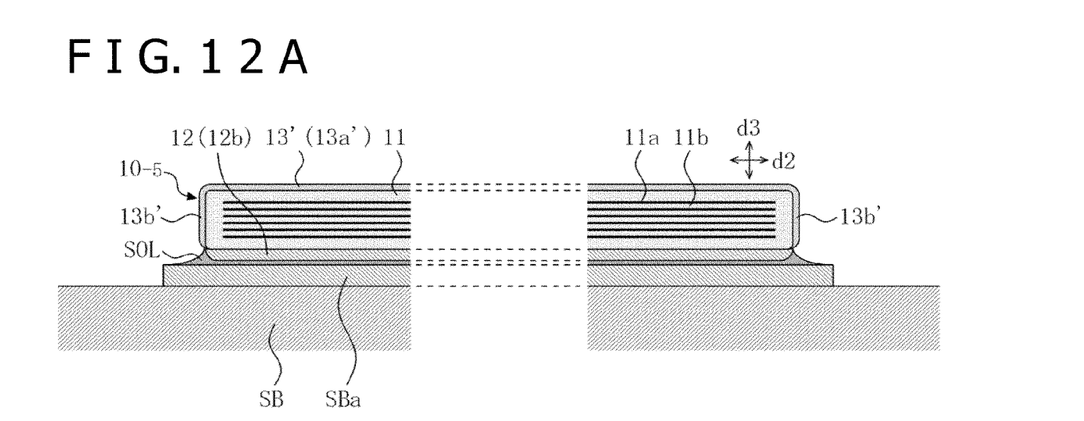
FIG. 12A is a drawing corresponding to FIG. 11A, illustrating a state of mounting the ceramic electronic component according to the fifth embodiment.
Figure 12B:
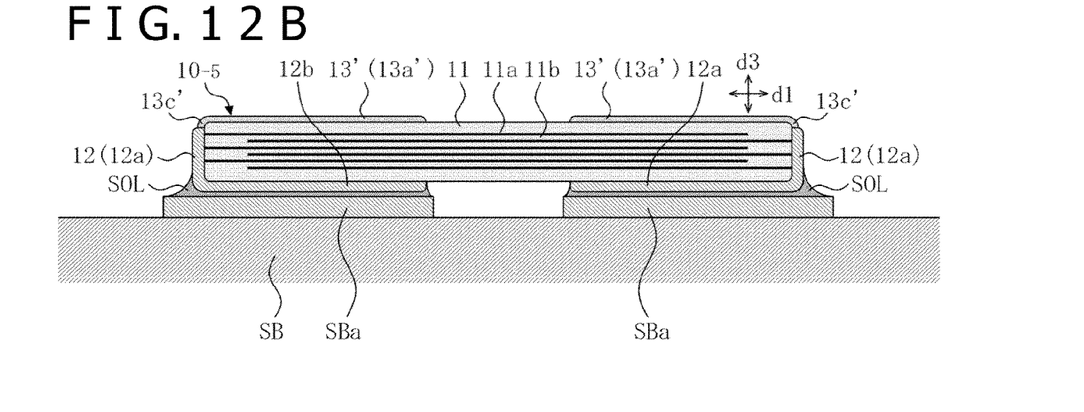
FIG. 12B is a drawing corresponding to FIG. 11B, illustrating a state of mounting the ceramic electronic component.

FIGS. 11A and 11B present a ceramic electronic component 10-5 (multilayer ceramic capacitor) according to a fifth embodiment of the present disclosure, and FIGS. 12A and 12B present a state that the ceramic electronic component 10-5 is mounted on the circuit board SB.

The ceramic electronic component 10-5 (multilayer ceramic capacitor) depicted in FIGS. 11A and 11B is different in the configuration from the ceramic electronic component 10-1 (multilayer ceramic capacitor) according to the first embodiment depicted in FIGS. 2A, 2B, 2C, 2D, 3A and 3B in that:

the protective portion 13 is divided into two parts in the first direction d1, and main layer portions 13a' of the respective divided protective portions 13' are disposed apart from each other in the first direction d1 on the other face in the third direction d3, of the ceramic component body 11 (upper face in FIG. 11B).

Incidentally, the first direction dimension D1 [13a] of the main layer portion 13a' of each of the divided protective portions 13' is slightly larger than the first direction dimension D1 [12b] of the second face portion 12b of each external electrode 12. In other words, the first direction dimension D1 [13a] of the main layer portion 13a' of each of the divided protective portions 13' is equivalent to the first direction dimension D1 [12b] of the second face portion 12b of each external electrode 12.

Compared to the ceramic electronic component 10-1 (multilayer ceramic capacitor) according to the first embodiment depicted in FIGS. 2A, 2B, 2C, 2D, 3A and 3B, the ceramic electronic component 10-5 (multilayer ceramic capacitor) depicted in FIGS. 11A and 11B has the protective portions 13 divided into two parts in the first direction d1, but can provide the same effect as described hereinbefore in the soldering for mounting the ceramic electronic component 10-5 on the circuit board SB (see FIGS. 12A and 12B).

In the ceramic electronic component 10-5 (laminated ceramic capacitor) according to the fifth embodiment depicted in FIGS. 11A and 11B, the third direction dimension D3 "13b'" of the first wraparound portion 13b' of each of the divided protective portions 13' may be set to the same as the third direction dimension D3 "13b" of the first wraparound portion 13b in the ceramic electronic component 10-2 (multilayer ceramic capacitor) according to the second embodiment depicted in FIGS. 5A and 5B or in the ceramic electronic component 10-3 (multilayer ceramic capacitor) according to the third embodiment depicted in FIGS. 7A and 7B.

Sixth Embodiment

Figure 13A:
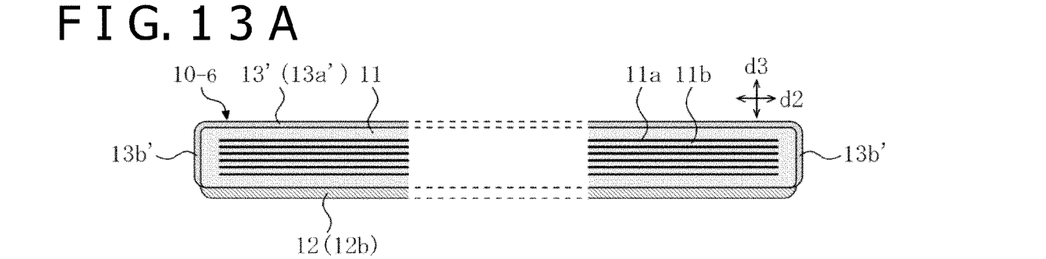
FIG. 13A is a drawing corresponding to FIG. 3A, illustrating the ceramic electronic component according to a sixth embodiment of the present disclosure.
Figure 13B:
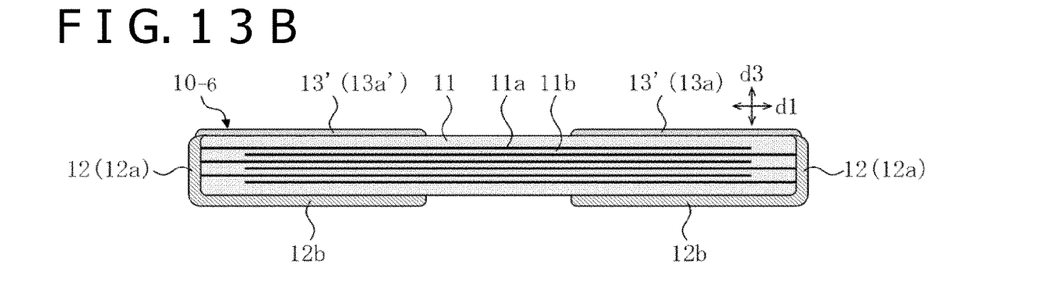
FIG. 13B is a drawing corresponding to FIG. 3B, illustrating the ceramic electronic component.
Figure 14A:
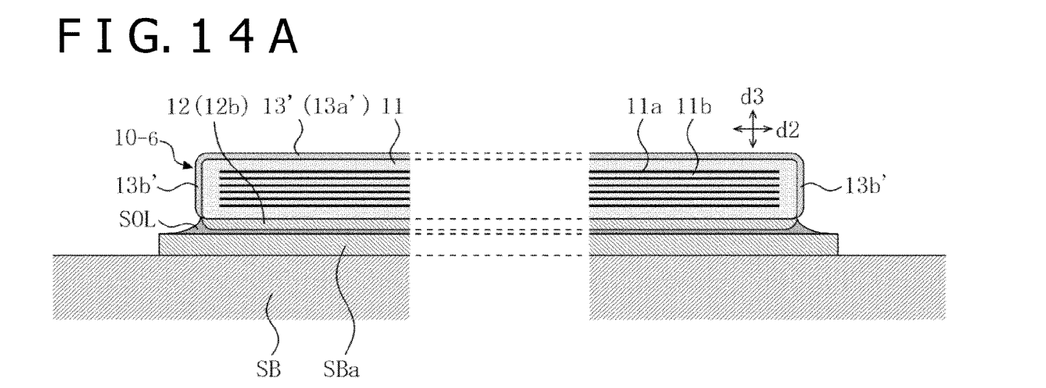
FIG. 14A is a drawing corresponding to FIG. 13A, illustrating a state of mounting the ceramic electronic component according to the sixth embodiment.
Figure 14B:
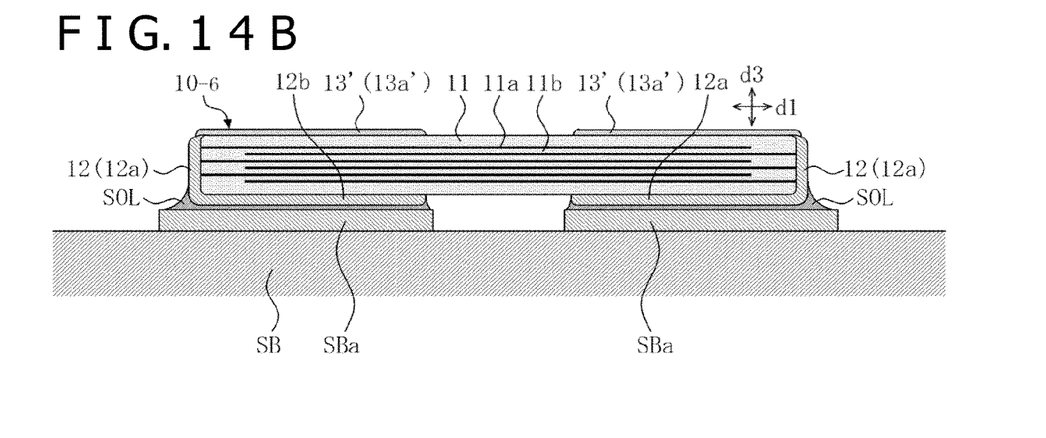
FIG. 14B is a drawing corresponding to FIG. 13B, illustrating a state of mounting the ceramic electronic component.

FIGS. 13A and 13B present a ceramic electronic component 10-6 (multilayer ceramic capacitor) according to a sixth embodiment of the present disclosure, and FIGS. 14A and 14B present a state of mounting the ceramic electronic component 10-6 on the circuit board SB.

The ceramic electronic component 10-6 (multilayer ceramic capacitor) depicted in FIGS. 13A and 13B is different in the configuration from the ceramic electronic component 10-1 (multilayer ceramic capacitor) according to the first embodiment depicted in FIGS. 2A, 2B, 2C, 2D, 3A and 3B in that:

the end in the third direction d3, of the first face portion 12a of each external electrode 12 (upper end in FIG. 13B) reaches the other face-side end in the third direction d3 on each of the two faces in the first direction d1, of the ceramic component body 11 (upper ends of the left and right faces in FIG. 13B) or the end of the other face (upper face in FIG. 13B) in the third direction d3, of the ceramic component body 11, i.e. the third direction dimension D3 [12a] of the first face portion 12a of each external electrode 12 is equivalent to the third direction dimension D3 [11] of the ceramic component body 11; the protective portion 13 is divided into two parts in the first direction d1, and the main layer portions 13a' of the respective divided protective portions 13' are disposed apart from each other in the first direction d1 on the other face in the third direction d3, of the ceramic component body 11 (upper face in FIG. 13B); and each divided protective portion 13' does not have each second wraparound portion 13c, and the edge portion in the first direction d1, of the main layer portion 13a of each divided protective portion 13' contacts the first face portion 12a of each external electrode 12.

Incidentally, the first direction dimension D1 [13a'] of the main layer portion 13a' of each divided protective portions 13' is slightly larger than the first direction dimension D1 [12b] of the second face portion 12b of each external electrode 12. In other words, the first direction dimension D1 [13a'] of the main layer portion 13a' of each divided protective portions 13' is equivalent to the first direction dimension D1 [12b] of the second face portion 12b of each external electrode 12.

Compared to the ceramic electronic component 10-1 (multilayer ceramic capacitor) according to the first embodiment depicted in FIGS. 2A, 2B, 2C, 2D, 3A and 3B, the ceramic electronic component 10-6 (multilayer ceramic capacitor) depicted in FIGS. 13A and 13B do not have the respective second wraparound portions 13c on the protective portion 13 and furthermore has the protective portion 13 divided into two ports in the first direction d1, but can provide the same effect as described hereinbefore in the soldering for mounting the ceramic electronic component 10-6 on the circuit board SB (see FIGS. 14A and 14B).

OTHER EMBODIMENTS

Figure 15A:
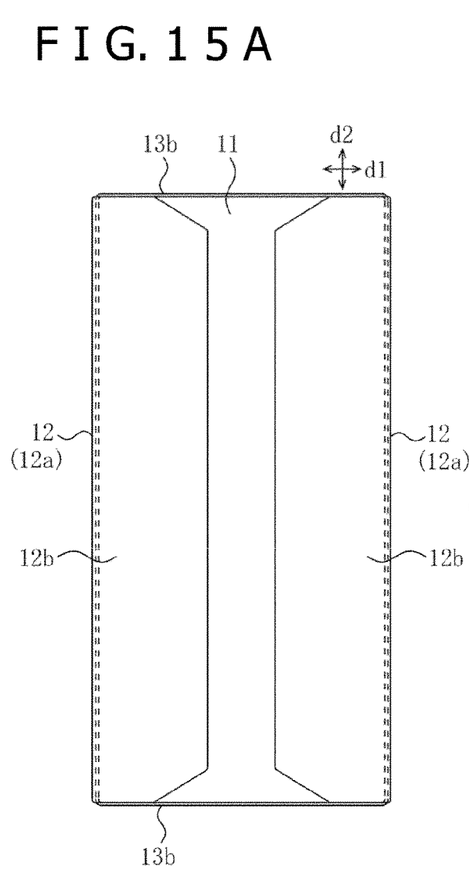
FIG. 15A is a drawing illustrating an example of a transformed second face portion of each external electrode.
Figure 15B:
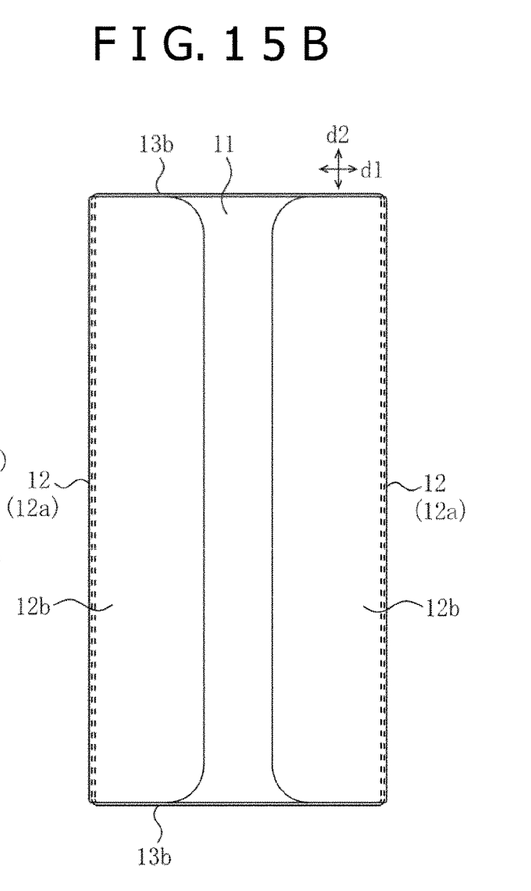
FIG. 15B is a drawing illustrating another example of the transformed second face portion of each external electrode.

<V1> For the ceramic electronic components 10-1 to 10-6 (multilayer ceramic capacitor) according to each embodiment, the described is the second face portion 12b of each external electrode 12 having a rectangular bottom view, but the bottom view of each second face portion 12b may be shaped into a hexagon as depicted in FIG. 15A, or a trapezoid not depicted in the figure. In addition, as depicted in FIG. 15B, the bottom view of each second face portion 12b may be shaped into a shape having two rounded corner portions.

<V2> For the ceramic electronic components 10-1 to 10-6 (multilayer ceramic capacitor) according to each embodiment, each external electrode 12 having the second direction dimensions D2 of the first face portion 12a and the second face portion 12b [12a and 12b] which are the same or approximately the same as the second direction dimension D2 [11] of the ceramic component body 11 has been described, but the second direction dimensions D2 of the first face portion 12a and the second face portion 12b [12a and 12b] of each external electrode 12 may be slightly smaller than the second direction dimension D2 [11] of the ceramic component body 11.

<V3> For the ceramic electronic components 10-1 to 10-6 (multilayer ceramic capacitor) according to each embodiment, the ceramic component body 11 meeting the relationship "first direction dimension D1 [11]<second direction dimension D2 [11]" has been described, but the same effects as described hereinbefore can be obtained even in a case that the first direction dimension D1 [11] and the second direction dimension D2 [11] have a relationship "first direction dimension D1 [11]>second direction dimension D2 [11]," or a relationship "first direction dimension D1 [11]=second direction dimension D2 [11]."

<V4> In each embodiment, the ceramic electronic components 10-1 to 10-6 in which the present disclosure is applied to the multilayer ceramic capacitor have been described, but the present disclosure can be applied to a ceramic electronic component other than the multilayer ceramic capacitor, for example, a multilayer ceramic varistor, a multilayer ceramic inductor, or the like. In other words, the same effects as described hereinbefore can be obtained by applying the present disclosure as long as the ceramic electronic component has the external electrodes 12 on each of the opposing ends of the rectangular parallelepiped ceramic component body 11 incorporating a functional portion.

It should be understood by those skilled in the art that various modifications, combinations, sub-combinations and alterations may occur depending on design requirements and other factors insofar as they are within the scope of the appended claims or the equivalent thereof.

The present disclosure contains subject matter related to that disclosed in Japanese Priority Patent Application JP 2018-158014 filed in the Japan Patent Office on Aug. 27, 2018, the entire content of which is hereby incorporated by reference.

What is claimed is:

1. A ceramic electronic component, comprising:
   a ceramic component body including a functional portion, wherein
      a facing direction of first two opposing faces of the ceramic component body is defined as a first direction,
      a facing direction of second two opposing faces of the ceramic component body is defined as a second direction,
      a facing direction of third two opposing faces of the ceramic component body is defined as a third direction, and
      a dimension between the first two opposing faces along the first direction is defined as a first direction dimension, a dimension between the second two opposing faces along the second direction is defined as a second direction dimension, and a dimension between the third two opposing faces along the third direction is defined as a third direction dimension;
   an external electrode of a two-face type including:
      a first face portion disposed on a face of the first two opposing faces in the first direction, of the ceramic component body, wherein the face of the first two opposing faces, in the first direction, of the ceramic component body has a vacant space where an end, in the third direction, of the first face portion of the external electrode does not reach; and
      a second face portion disposed on a first face of the third two opposing faces in the third direction, of the ceramic component body; and
   a protective portion including:
      a main layer portion disposed directly on and in contact with a second face of the third two opposing faces in the third direction, of the ceramic component body, wherein the second face is opposite to the first face in the third direction;
      a first wraparound portion disposed continuously with the main layer portion, wherein the first wraparound portion is disposed directly on and in contact with each of the second two opposing faces in the second direction, of the ceramic component body; and
      a second wraparound portion disposed continuously with the main layer portion on the vacant space, wherein the second wraparound portion is disposed directly on and in contact with the face of the first two opposing faces in the first direction of the ceramic component body.

2. The ceramic electronic component according to claim 1, wherein the third direction dimension of the first wraparound portion is equivalent to the third direction dimension of the ceramic component body.

3. The ceramic electronic component according to claim 1, wherein the third direction dimension of the first wraparound portion is smaller than the third direction dimension of the ceramic component body.

4. The ceramic electronic component according to claim 1, wherein
   at least a part of the second wraparound portion contacts the end of the first face portion of the external electrode in a non-overlapping manner in the first direction.

5. The ceramic electronic component according to claim 1, wherein the third direction dimension of the first wraparound portion is larger than the third direction dimension of the second wraparound portion.

6. The ceramic electronic component according to claim 1, wherein the third direction dimension of the first wraparound portion is equivalent to the third direction dimension of the second wraparound portion.

7. The ceramic electronic component according to claim 1, wherein
   the third direction dimension of the first face portion of the external electrode is equivalent to the third direction dimension of the ceramic component body, and
   the main layer portion of the protective portion contacts the first face portion of the external electrode.

8. The ceramic electronic component according to claim 1, wherein the main layer portion of the protective portion is divided into two portions including a first portion and a second portion on the second face in the third direction, of the ceramic component body, and the first portion of the main layer portion is disposed apart from the second portion of the main layer portion in the first direction, of the ceramic component body.

9. The ceramic electronic component according to claim 8, wherein each of the first portion and the second portion contacts the first face portion of the external electrode on either side of the ceramic component body, and the first direction dimension of each of the first portion and the second portion of the main layer portion is equal to the first direction dimension of the second face portion of the external electrode.

10. The ceramic electronic component according to claim 1, wherein the third direction dimension of the ceramic component body is equal to or less than 100 μm.

11. The ceramic electronic component according to claim 1, wherein the third direction dimension of the ceramic component body is equal to or less than 50 μm.

12. The ceramic electronic component according to claim 1, wherein the ceramic electronic component is a multilayer ceramic capacitor.

13. The ceramic electronic component according to claim 1, wherein the first direction dimension of the ceramic component body is less than the second direction dimension of the ceramic component body.

14. An electronic component-mounting circuit board, comprising:

a ceramic electronic component mounted on the electronic component-mounting circuit board, wherein the ceramic electronic component includes:

a ceramic component body including a functional portion, wherein a facing direction of first two opposing faces of the ceramic component body is defined as a first direction, a facing direction of second two opposing faces of the ceramic component body is defined as a second direction, a facing direction of third two opposing faces of the ceramic component body is defined as a third direction, and a dimension between the first two opposing faces along the first direction is defined as a first direction dimension, a dimension between the second two opposing faces along the second direction is defined as a second direction dimension, and a dimension between the third two opposing faces along the third direction is defined as a third direction dimension, an external electrode of a two-face type including:

a first face portion disposed on a face of the first two opposing faces in the first direction, of the ceramic component body, wherein the face of the first two opposing faces, in the first direction, of the ceramic component body has a vacant space where an end, in the third direction, of the first face portion of the external electrode does not reach; and a second face portion disposed on a first face of the third two opposing faces in the third direction, of the ceramic component body; and a protective portion including:

a main layer portion disposed directly on and in contact with a second face of the third two opposing faces in the third direction, of the ceramic component body, wherein the second face is opposite to the first face in the third direction;

a first wraparound portion disposed continuously with the main layer portion, wherein the first wraparound portion is disposed directly on and in contact with each of the second two opposing faces in the second direction, of the ceramic component body; and a second wraparound portion disposed continuously with the main layer portion on the vacant space, wherein the second wraparound portion is disposed directly on and in contact with the face of the first two opposing faces in the first direction of the ceramic component body.

15. The electronic component-mounting circuit board according to claim 14, wherein the external electrode of the ceramic electronic component is connected to a conductive pad of the electronic component-mounting circuit board using solder.

16. The electronic component-mounting circuit board according to claim 14, wherein the first direction dimension of the ceramic component body is less than the second direction dimension of the ceramic component body.

17. A ceramic electronic component, comprising:

a ceramic component body including a functional portion, wherein a facing direction of first two opposing faces of the ceramic component body is defined as a first direction, a facing direction of second two opposing faces of the ceramic component body is defined as a second direction, a facing direction of third two opposing faces of the ceramic component body is defined as a third direction, and a dimension between the first two opposing faces along the first direction is defined as a first direction dimension, a dimension between the second two opposing faces along the second direction is defined as a second direction dimension, and a dimension between the third two opposing faces along the third direction is defined as a third direction dimension;

an external electrode of a two-face type including:

a first face portion disposed on a face of the first two opposing faces in the first direction, of the ceramic component body, wherein the face of the first two opposing faces, in the first direction, of the ceramic component body has a vacant space where an end, in the third direction, of the first face portion of the external electrode does not reach; and a second face portion disposed on a first face of the third two opposing faces in the third direction, of the ceramic component body; and a protective portion including:

a main layer portion disposed directly on and in contact with a second face of the third two opposing faces in the third direction, of the ceramic component body, wherein the main layer portion of the protective portion is divided into two portions including a first portion and a second portion on the second face in the third direction, of the ceramic component body, the first portion of the main layer portion is disposed apart from the second portion of the main layer portion in the first direction, and the first direction dimension of one of the first portion or the second portion of the main layer portion is equivalent to the first direction dimension of the second face portion of the external electrode;

a first wraparound portion disposed continuously with the main layer portion, wherein the first wraparound portion is disposed directly on and in contact with each of the second two opposing faces in the second direction, of the ceramic component body; and a second wraparound portion disposed continuously with the main layer portion on the vacant space, wherein the second wraparound portion is disposed directly on and in contact with the face of the first two opposing faces in the first direction of the ceramic component body.

\* \* \* \* \*